United States Patent [19]

Kennedy

[11] 4,044,316

[45] Aug. 23, 1977

[54] STABILIZED CAVITY-DUMPED ND:YAG LASER

[75] Inventor: Chandler J. Kennedy, Huntington Beach, Calif.

[73] Assignee: The United States of America as represented by the Secretary of the Air Force, Washington, D.C.

[21] Appl. No.: 678,506

[22] Filed: Apr. 19, 1976

[51] Int. Cl.² ............................................. H01S 3/13
[52] U.S. Cl. ........................ 331/94.5 S; 331/94.5 C; 331/94.5 N; 331/94.5 Q
[58] Field of Search ............... 331/94.5 S, 94.5 M, 331/94.5 C, 94.5 N, 94.5 T, 94.5 Q

[56] References Cited

U.S. PATENT DOCUMENTS 3,804,490  4/1974  Montgomery et al. ... 331/94.5 M X
3,947,780  3/1976  Rice et al. ..................... 331/94.5 M

OTHER PUBLICATIONS

D. Cheng, "Instability of Cavity-Dumped YAG Laser Due To Time-Varying Reflections", IEEE J. of Quantum Electronics, vol. QE-9, No. 6, June 1973.

C. J. Kennedy et al., "Stability of an Intercavity Frequency-Doubled Nd:YAG Laser", IEE J. of Quantum Electronics, vol. QE-10, No. 8, Aug. 1974.

Primary Examiner—Michael J. Lynch
Assistant Examiner—James W. Davie
Attorney, Agent, or Firm—Joseph E. Rusz; Robert Kern Duncan

[57] ABSTRACT

In cavity dumped state lasers the relaxation oscillations caused by cavity dumping are stabilized and damped out by placing a non-linear second-harmonic generation crystal inside the optical cavity of the laser and phase-matching it to produce a doubled frequency component of approximately 0.1% that of the circulating power. The degree of damping depends on the conversion percentage, which may be varied by temperature controlling the frequency doubling crystal. A conventional antireflection coating is placed on the crystal to minimize losses.

3 Claims, 3 Drawing Figures

STABILIZED CAVITY-DUMPED ND:YAG LASER

RIGHTS OF THE GOVERNMENT

The invention described herein may be manufactured and used by or for the Government of the United States for all governmental purposes without the payment of any royalty.

BACKGROUND OF THE INVENTION

The field of the invention is in the laser communication art.

When solid state lasers (Nd:YAG,Ruby) are cavity dumped with a large fraction of the circulating power being coupled out, a sudden change in circulating power occurs. After the dumping phase is over, power must again build up in the cavity. However, due to the slow response time of the gain in these systems, the intracavity power overshoots the steady state value and commences an oscillation whose damping time is on the order of several hundred microseconds. If the cavity must be dumped during this period, one will be highly uncertain of the amplitude of the coupled-out pulse. An intracavity frequency doubler positioned in the cavity as disclosed herein will decrease this damping time so that pulses may be dumped more frequently with less variation in amplitude.

Frequency doubling crystals and their use in laser cavities to produce relatively large amounts of second harmonic power are well known. The second harmonic power is conventionally used as another beam of intelligence carrying radiation with appreciable circulating power extracted from the cavity to produce the high frequency beam.

The following publications may be helpful in further understanding the invention.

U.S. Pat. Nos. 3,648,193 to patentees Foster et al, 3,703,687 to patentee Maydan, 3,766,393 to patentees Herzog et al, 3,869,680 to Fletcher et al, and C. J. Kennedy and J. D. Barry "Stability of an Intracavity Frequency Doubled Nd:YAG Laser", IEEE J. Quant. Electronics, Vol. QE-10, No. 8, pp 596–599, August 1974.

SUMMARY OF THE INVENTION

The invention provides an improved cavity dumped laser by suppressing the relaxation oscillations induced by the cavity dumping, therefore increasing the useful output of this type laser for communications purposes. In addition to shortening the recovery time of the laser after a dumping of power, the effective noise level output is also suppressed by reducing the peaks and the duration of the relaxation oscillations taking place after dumping.

DESCRIPTION OF THE PREFERRED EMBODIMENT

This invention is concerned with the damping of the relaxation oscillations in a substantially single frequency cavity dumped laser, i.e., a laser providing only fundamental frequency output energy. It is not concerned with the generation of a second harmonic beam to be extracted and used as another beam. Indeed, since the frequency doubler appears as a loss to the laser its coupling must be relatively minimized so as not to degrade the circulating power in the laser to a significant degree. Since large non-linear coupling is undesirable, the frequency doubler may be located substantially anywhere in the cavity, regardless of the beam size of its location.

Figure 1:
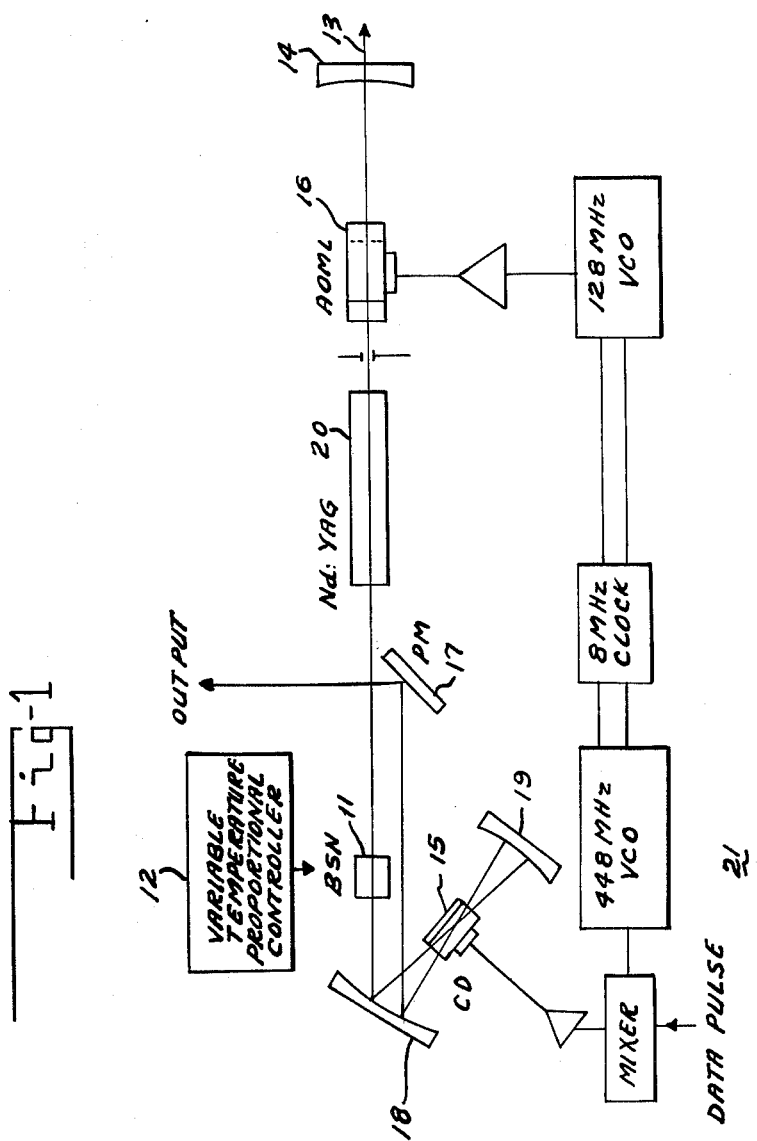
FIG. 1 is a block-schematic representation of an embodiment of the invention.

A specific embodiment of the invention as shown in FIG. 1 provides an improved mode-locked and cavity-dumped Nd:YAG laser for a pulse interval modulation (PIM) communication system. Cavity dumping in conventional Nd:YAG lasers induces relaxation oscillations with a fairly long damping time. This makes medium data rate communication with these lasers in PIM cavity dump mode difficult since the circulating power at the dumping time is highly uncertain. The result is a noisy transmission which forces an unnaturally low receiver threshhold and results in increased error rates. A stabilized laser as herein disclosed provides a considerable improvement to this type system in damping relaxation oscillations from one dumping event before it becomes necessary to dump again.

Figure 2:
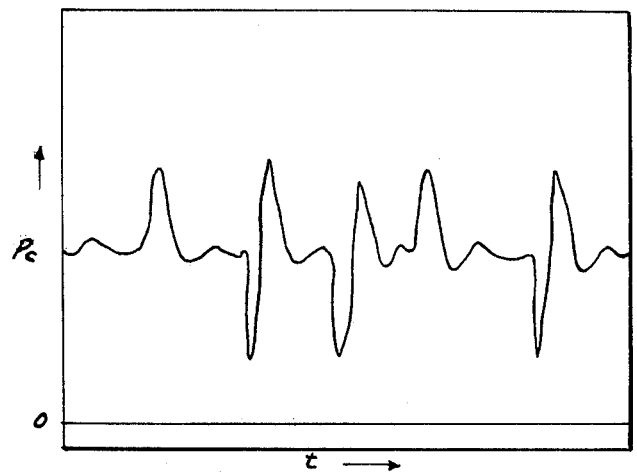
FIG. 2 is a copy of an oscilloscope trace showing typical circulating power fluctuations as a result of cavity dumping of a stabilized laser.

FIG. 1 shows a typical operating embodiment of the invention comprising a conventional 1.06μ wavelength Nd:YAG cavity dumped laser with the addition of a BSN (Barium-Sodium-Niobium) crystal and oven assembly 11 and controller 12. The circulating power of approximately 25 watts in the cavity was monitored as leakage 13 through mirror 14 by a PIN photodiode. A proportional controller 12 was used to keep the BSN crystal near phase match temperature for optimum second harmonic conversion. Typically, about 10 mW, single directional 0.53μ power was generated at most. This 10 mw of second harmonic power amounts to approximately 0.04% of the approximately 25 W of circulating power. The laser was mode-locked to eliminate free-running noise, and cavity dumped at the maximum available percentage which was conventionally determined by the r-f pulse width and power amplifier gain. The cavity dumper 15 operated in the PIM data mode in which the spacing between pairs of pulses was random between 15 and 45μ second intervals. FIG. 2 was the result and shows the reaction of the circulating power at a sweep rate of 20μ sec/cm. The reduction in circulating power at a dump indicated that 70% of the power was dumped each time. (The average dumping rate was approximately 32 KHz.) The damping factor for the ensuing oscillations is about $1.3 \times 10^5$, which is an order of magnitude (power of 10) above typical damping factors for this type laser. Theoretically, when non-linear damping dominates.

$\gamma = (\epsilon P_c/\tau$, where $\gamma$ = damping factor $P_c$ = intracavity circulating power $\tau$ = the cavity round-trip time $2L/C$ $\epsilon$ = coupling coefficient for intracavity doubling and $P_{sh}$ the single directional second harmonic power = $\epsilon P_c^2$. Therefore;

$$\gamma = \frac{P_{sh}}{\tau P_c}$$

and from the observed $\gamma$ and $P_c$, $P_{sh}$ must be 13 mW, for this particular embodiment, which is close to the aforementioned power at $0.53\mu$.

This calculated figure of 13 mw representing 0.052% of the total power and the previously observed figure of 0.04%, obtained from this particular embodiment being described, are not critical. Values of second harmonic power of approximately 0.1%, as mentioned earlier in the ABSTRACT, may be used without appreciably decreasing the fundamental output of the laser, yet generally assuring in lasers of the type described, good damping of the relaxation oscillations associated with dumping. As previously mentioned, the proportional controller 12 may, if desirable, be used to keep the BSN crystal at a temperature which will provide the optimum amount of second harmonic conversion for the desired damping of the fundament with a negligible amount of loss of fundamental energy.

Figure 3:
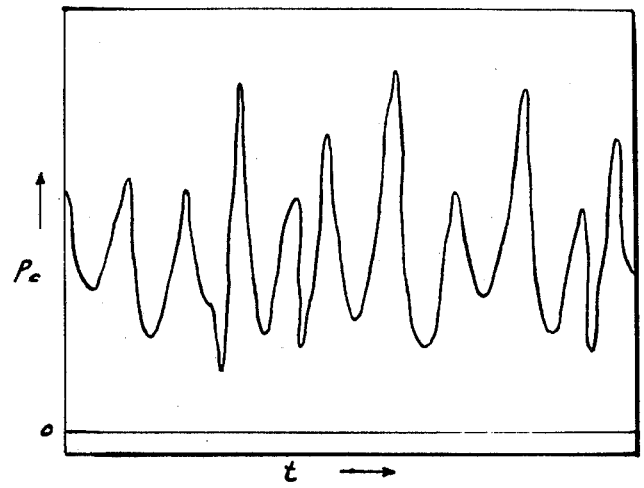
FIG. 3 is a copy of an oscilloscope trace showing the circulating power fluctuations with lowered non-linear coupling compared to FIG. 2, but with all other parameters the same.

In order to observe the effect of reduced damping, the temperature of the BSN was reduced to 85° C from the 91° C phase match temperature. FIG. 3 shows the large oscillations which resulted. The damping constant here is $3.3 \times 10^4$, which is yet four times the normal damping conventionally present in the system without the BSN. Some small second harmonic power was still being generated — about a milliwatt, but the circulating power of 25 W remained unchanged from the previous measurement. It may thus be concluded that no observable degradation in power was involved in achieving high damping constants.

It is to be noted that the circulating power at dumping varies considerably in FIG. 3, but hardly at all in FIG. 2. This demonstrates the reduction in noise on the dumped output as a result of intracavity frequency doubling. Ordinarily, the same amount of noise would have been produced by an 8% dump and thus the usable power of the laser has increased about tenfold. This is a major improvement in performance for this type of laser communicator in the medium data rate category and greatly extends the application of the device.

In this particular embodiment being described in detail and illustrated in FIG. 1, the frequency doubler 11 is a conventional $Ba_2Na(NbO_3)_5$ frequency doubler and oven. Its' placement in the cavity is not critical except that it should be placed in a portion of the cavity where the intensity of the fundamental laser circulating power intercepted is high enough to convert approximately 0.1% of the circulating power to the second harmonic, which generally is not at all critical. AMOL 16 is a conventional acousto-optic mode locker, CD 15 is a conventional cavity dumper, and PM 17 is a conventional pick-off mirror. Mirrors 14, 18, and 19 are conventional laser cavity mirrors. In this embodiment cavity dumper 15 is located approximately 6 cm from mirror 19. Mirror 19 has a radius of approximately 6 cm, mirror 14 a radius of approximately 100 cm, and the radius of mirror 18 is approximately 12 cm. The Nd:YAG solid state laser element 20 is also conventional as is the laser physical structure, the modulation equipment and associated apparatus 21. In some embodiments of the invention the frequency doubler and the acousto-optic or electro-optic cavity dumper may conventionally be one and the same device, hence, proliferation of intracavity devices and their attendant losses is avoided.

I claim:

1. In a cavity dumped, solid state laser having an optical cavity with circulating power of a fundamental frequency and wherein the laser output frequency is only at said fundamental frequency, said laser having a solid state laser element in said optical cavity, an improvement for decreasing relaxation oscillations associated with dumping, wherein said improvement comprises:
    a. a second harmonic generation crystal for generating second harmonic power from said fundamental frequency circulating power positioned in said optical cavity in intercepting relationship with said fundamental circulating power; and
    b. means for controlling the temperature of said second harmonic generation crystal to provide a second harmonic power of approximately 0.05% to 0.1% of said fundamental frequency circulating power, whereby relaxation oscillations associated with dumping are decreased.

2. The improvement as claimed in claim 1 wherein the solid state laser element is a Nd:YAG crystal.

3. The improvement as claimed in claim 2 wherein the said second harmonic generation crystal is a $Ba_2Na(NbO_3)_5$ crystal.

* * * * *